United States Patent
Bastide et al.

(10) Patent No.: US 10,410,432 B2
(45) Date of Patent: Sep. 10, 2019

(54) INCORPORATING EXTERNAL SOUNDS IN A VIRTUAL REALITY ENVIRONMENT

(71) Applicant: International Business Machines Corporation, Armonk, NY (US)

(72) Inventors: Paul R. Bastide, Boxford, MA (US); Matthew E. Broomhall, Goffstown, NH (US); Liam S. Harpur, Skerries (IE); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/796,026

(22) Filed: Oct. 27, 2017

(65) Prior Publication Data
US 2019/0130654 A1 May 2, 2019

(51) Int. Cl.
*G06T 19/20* (2011.01)
*G06F 3/0481* (2013.01)
*G06K 9/00* (2006.01)
*G06F 3/01* (2006.01)
*G06F 3/16* (2006.01)

(52) U.S. Cl.
CPC .............. *G06T 19/20* (2013.01); *G06F 3/011* (2013.01); *G06F 3/04815* (2013.01); *G06F 3/167* (2013.01); *G06K 9/00671* (2013.01)

(58) Field of Classification Search
CPC .......... G06T 19/20; G06F 3/011; G06F 3/167
See application file for complete search history.

(56) References Cited

U.S. PATENT DOCUMENTS

| 7,787,638 | B2 | 8/2010 | Lokki et al. |
| 8,396,226 | B2 | 3/2013 | Knickrehm et al. |
| 9,226,090 | B1 | 12/2015 | Norris et al. |
| 2007/0195012 | A1* | 8/2007 | Ichikawa ............. G02B 27/017 345/8 |
| 2010/0040238 | A1* | 2/2010 | Jang ....................... H04S 7/302 381/17 |
| 2010/0100851 | A1 | 4/2010 | Clark et al. |
| 2013/0007201 | A1* | 1/2013 | Jeffrey .............. H04M 1/72569 709/217 |
| 2013/0335301 | A1* | 12/2013 | Wong .................. G02B 27/0093 345/8 |
| 2014/0376728 | A1* | 12/2014 | Ramo ................... G06T 19/006 381/56 |

(Continued)

OTHER PUBLICATIONS

M. K. I. Molla and K. Hirose, "Automatic Life-Logging: A novel approach to sense real-world activities by environmental sound cues and common sense", 2008, IEEE, pp. 294-299 (Year: 2008).*

(Continued)

*Primary Examiner* — Barry Drennan
*Assistant Examiner* — Terrell M Robinson
(74) *Attorney, Agent, or Firm* — Richard Wilhelm; Edell, Shapiro & Finnan, LLC

(57) ABSTRACT

A method, a system and a computer program product are provided. At least one processing system receives information regarding a real world sound detected in an environment in which a virtual reality device is located. The at least one processing system identifies a source of the real world sound and provides a visual representation of the source of the real world sound in virtual reality content provided to the virtual reality device for presentation to a user in a virtual reality session.

20 Claims, 4 Drawing Sheets

(56) References Cited

U.S. PATENT DOCUMENTS

| | | |
|---|---|---|
| 2015/0017615 A1 | 1/2015 | Mossner et al. |
| 2015/0254882 A1* | 9/2015 | Englert .............. G02B 27/0093 |
| | | 345/633 |
| 2016/0282618 A1* | 9/2016 | Kon ..................... G02B 27/017 |
| 2016/0335808 A1* | 11/2016 | Novak .................... G06F 3/011 |
| 2017/0127209 A1 | 5/2017 | Bostick et al. |
| 2018/0020312 A1* | 1/2018 | Visser .................... H04R 5/033 |
| 2018/0025504 A1* | 1/2018 | Mason ...................... G06T 7/50 |
| | | 345/419 |
| 2018/0301135 A1* | 10/2018 | Yamabe ........... G10K 11/17823 |

OTHER PUBLICATIONS

Naoe, M., Kimura, T. & Yamakata, Y. et al. (2008). Performance Evaluation of 3D Sound Field Reproduction System Using a Few Loudspeakers and Wave Field Synthesis. 2008 Second International Symposium on Universal Communication. pp. 36-41. DOI: 10.1109/ISUC.2008.35. See sections 2.3 & 2.4.

Reddy, S., Rao, S. & Hedge, R. M. (2016). On the development of a dynamic virtual reality system using audio and visual scenes. Twenty Second National Conference on Communication. Guwahati, India. DOI: 10.1109/NCC.2016.7561204, 6 pages.

Anderson, D., B. & Casey, M. A. (1997). The Sound Dimension. IEEE Spectrum, 34(3), Mar. 1997, pp. 46-50.

* cited by examiner

INCORPORATING EXTERNAL SOUNDS IN A VIRTUAL REALITY ENVIRONMENT

BACKGROUND

Present invention embodiments relate to systems, methods and computer program products for incorporating sounds from a real world environment into a virtual reality environment. In particular, the present invention embodiments relate to incorporating a visual representation of a source of a real world sound into a virtual reality environment of a virtual reality session.

Virtual reality devices such as, for example, virtual reality goggles, are becoming more commonplace. When using virtual reality goggles in a real world environment, a user of the virtual reality goggles may hear real world sounds that are inconsistent with a virtual reality environment being experienced by the user. For example, the user may hear a sound of an approaching airplane, may reflexively look up while in a virtual reality session, and not find a visual representation of a source of the sound in the virtual reality environment. As a result, the user may feel confused and disoriented.

Noise canceling technology could be used to block out unwanted sounds while the user is in a virtual reality session. However, the blocked out sounds may include sounds that indicate an existence of a dangerous situation, of which the user would remain unaware.

SUMMARY

In a first aspect of embodiments of the invention, a machine-implemented method for creating a virtual reality environment is provided. At least one processing system receives information from a virtual reality device regarding a real world sound detected in an environment in which the virtual reality device is located. The at least one processing system identifies a source of the real world sound and provides a visual representation of the source of the real world sound in virtual reality content provided to the virtual reality device for presentation to a user in a virtual reality session.

In a second aspect of the embodiments, a system is provided for creating a virtual reality environment. The system includes at least one processing system, a network interface for connecting the at least one processing system to a virtual reality device via a network, and memory connected with at least one processor of the at least one processing system, wherein the memory includes instructions that configure the at least one processor to perform: receiving information regarding a real world sound detected in an environment in which a virtual reality device is located; identifying a source of the real world sound; and providing a visual representation of the source of the real world sound in virtual reality content provided to the virtual reality device for presentation to a user in a virtual reality session.

In a third aspect of the embodiments, a computer program product is provided. A computer readable storage medium includes computer readable program code, embodied therewith, for execution on a processing system. The computer readable program code is configured to be executed by the processing system to: receive information regarding a real world sound detected in an environment in which a virtual reality device is located; identify a source of the real world sound; and provide a visual representation of the source of the real world sound in virtual reality content provided to the virtual reality device for presentation to a user in a virtual reality session.

BRIEF DESCRIPTION OF THE DRAWINGS

Generally, like reference numerals in the various figures are utilized to designate like components.

DETAILED DESCRIPTION

Figure 1:
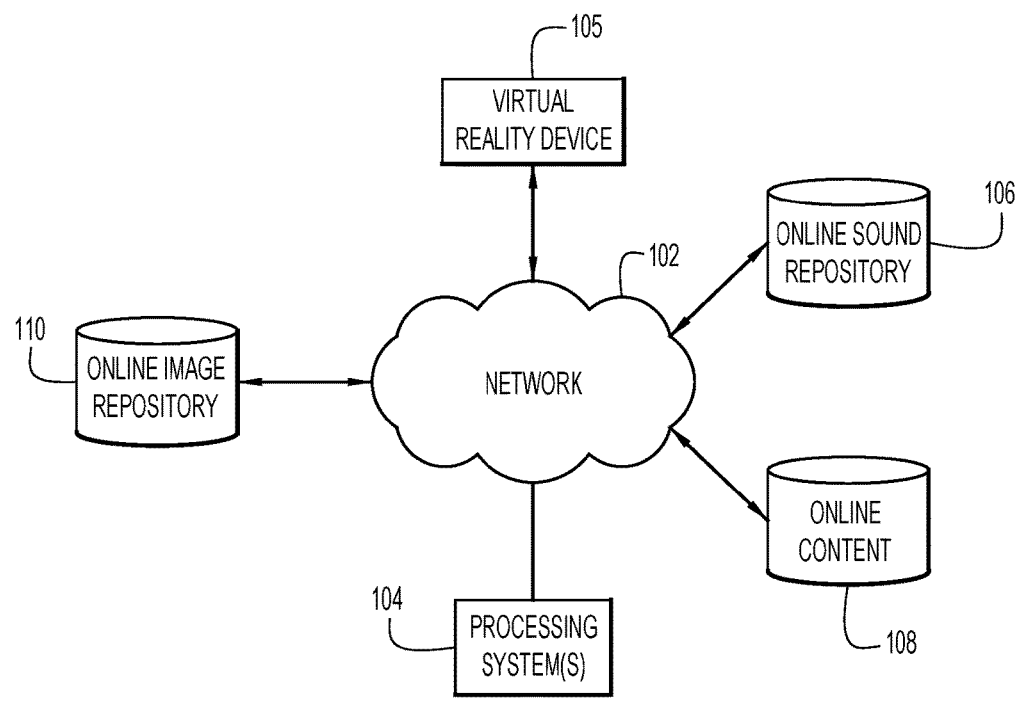
FIG. 1 illustrates an example environment in which various embodiments may operate.

Present invention embodiments include methods, systems and computer program products for incorporating external sounds into a virtual reality environment of an ongoing virtual reality session. In various embodiments, a virtual reality device may detect a real world sound from a real world environment surrounding the virtual reality device. The virtual reality device may provide data regarding the real world sound along with a geotag including current location information to a virtual reality server in order to identify a likely source of the sound and an approximate distance and direction of the likely source from a current location of the virtual reality device. The virtual reality server may make modifications to virtual reality content delivered to the virtual reality device such that the real world sound is not intrusive to the virtual reality environment, but enhances an overall experience of the virtual reality environment. For example, the virtual reality server may provide virtual reality content to the virtual reality device such that the virtual reality device displays a visual representation of the likely source of the sound at the determined approximate distance and direction from the virtual reality device in the virtual reality environment. If the visual representation of the likely source of the sound would not be visible from a current location in the virtual reality environment, the virtual server may queue up the visual representation of the likely source to be shown when a user is experiencing a location in the virtual reality environment from which the visual representation would be visible.

In some embodiments, the virtual reality device may have access to location information regarding a current location of the virtual reality device as well as other information. For example, a real world sound may be geotagged by the virtual reality device and reported to a virtual reality server, which identifies a source of the real world sound as an approaching train. The geotag may indicate to the virtual reality server that the virtual reality device is located near a particular train station. The virtual reality server may further have access to a local time of day as well as information regarding the particular train station including, but not limited to, train schedules of arriving and departing trains, hours of operation, etc. If the local time of day is a time during which many commuters are on their way home from work, the virtual reality server may incorporate a visual representation of the train filled with commuters into the virtual reality content delivered to the virtual reality device such that the virtual reality device displays the visual representation of the train filled with commuters in the virtual reality environment.

In various embodiments, the virtual reality server may have access to an online sound repository, which may include data representing a number of characteristics of different real world sounds that may occur during a virtual reality session. In the various embodiments, the virtual reality server may compare characteristics of detected real world sounds with the characteristics of the sounds in the online sound repository to determine a likely match in order to identify a source of the detected real world sound.

In some of the various embodiments, location information may be stored along with some of the characteristics of the real world sounds to associate those real world sounds with locations corresponding to the location information. Some embodiments may have access to online content including public images of different sources of real world sounds, which may be incorporated into the virtual reality environment as a visual representation of different real world sounds.

FIG. 1 illustrates an example environment in which embodiments may operate. Environment 100 may include a one or more processing systems 104 acting as a virtual reality server or a virtual reality server farm having a wired or wireless connection to a network 102. Network 102 may include one or more networks such as a local area network (LAN), a general wide area network (WAN), a public network (e.g., the Internet) or any combination thereof. Virtual reality device 105 may have a wired or a wireless connection with one or more processing systems 104 acting as the virtual reality server or the virtual reality server farm via network 102.

One or more processing systems 104 may have access to an online sound repository 106, online content 108 and an online image repository 110 via network 102.

Figure 2:
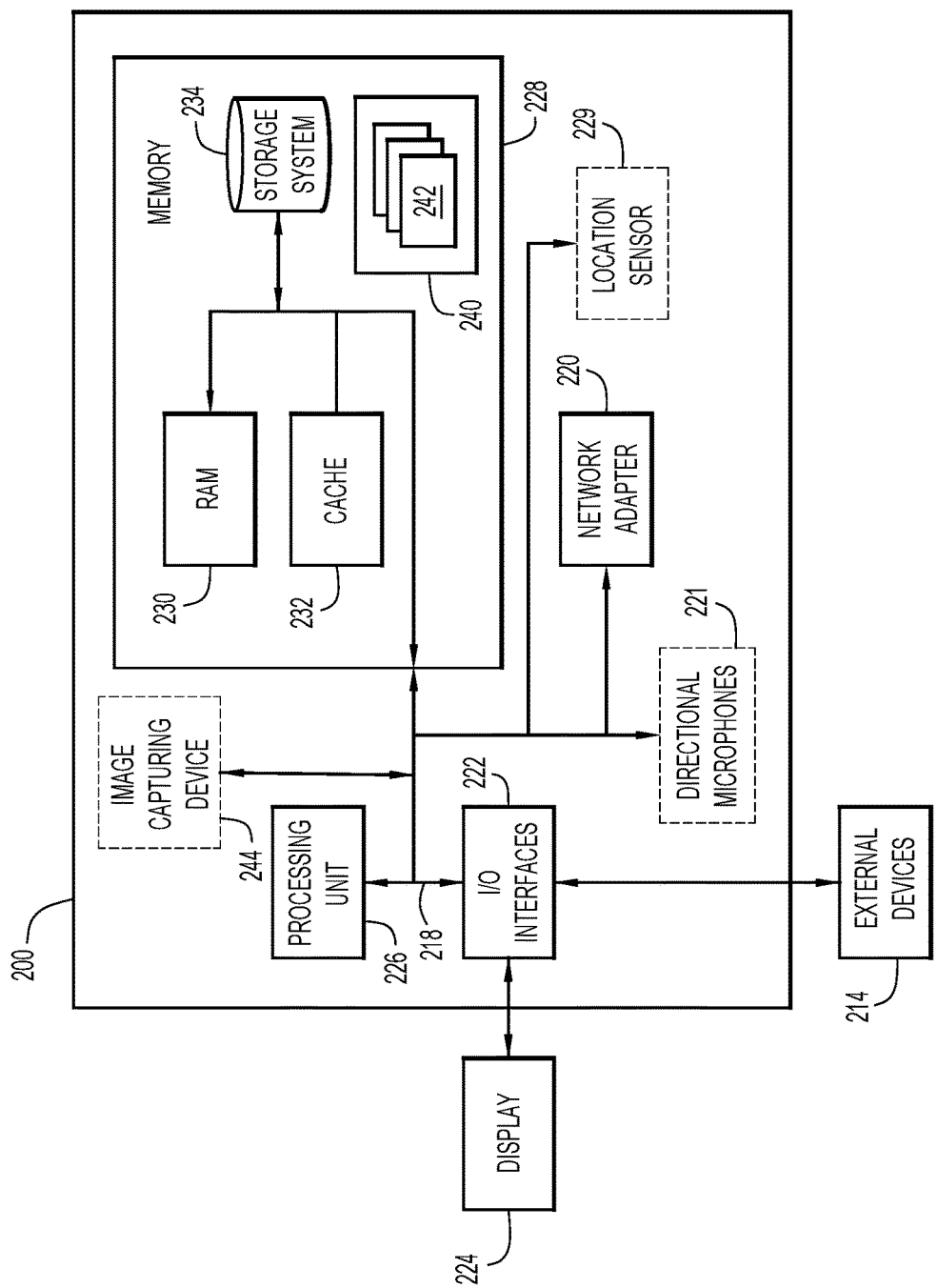
FIG. 2 is a functional block diagram of a computing system that may implement a virtual reality device and each of one or more processing systems, which may act as a virtual reality server or a virtual reality server farm.

FIG. 2 is a functional block diagram of a computing system 200 that may implement virtual reality device 105 and one or more processing systems 104 acting as a virtual reality server or a virtual reality server farm in various embodiments of the invention. Computing system 200 is shown in a form of a general-purpose computing device. Components of computing system 200 may include, but are not limited to, one or more processors or processing units 226, a system memory 228, and a bus 218 that couples various system components including system memory 228 to one or more processing units 226.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

When implementing virtual reality device 105, computing system 200 may include one or more image capturing devices 244 controlled by processing unit 226 connected to the one or more image capturing devices 244 via bus 218. For example, if virtual reality device 105 includes a pair of virtual reality goggles, image capturing portions of two image capturing devices 244 may be mounted in a forward facing direction, spaced apart, on the virtual reality goggles. Alternatively, a single image capturing portion may be mounted on the virtual reality goggles. One or more image capturing devices 244 provide images of the real world surroundings in case of a hazardous situation as described below. Further, computing system 200 may include two or more directional microphones 221 for capturing directional sound input and a location sensor 229 for determining a location of virtual reality device 105. In some embodiments, location sensor 229 may include a Global Positioning Satellite (GPS) sensor, a Wireless Fidelity (WiFi) positioning sensor, or another type of location sensor.

When computing system 200 implements a virtual reality server, one or more image capturing devices 244, directional microphones 221 and location sensors 229 may not be included in computing system 200.

Computing system 200 typically includes a variety of computer system readable media. Such media may be any available media that is accessible by computing system 200, and may include both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic media (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, one or more displays 224, one or more devices that enable a user to interact with computing system 200, and/or any devices (e.g., network card, modem, etc.) that enable computing system 200 to communicate with one or more other computing devices. Such communication can occur via Input/Output (I/O) interfaces 222. Still yet, computing system 200 can communicate with one or more networks such as a local area network (LAN), a general wide area network (WAN), and/or a public network (e.g., the Internet) via network adapter 220. As depicted, network adapter 220 communicates with the other components of computing system 200 via bus 118. It should be understood that, although not shown, other hardware and/or software components could be used in conjunction with computing system 200. Examples, include, but are not limited to: microcode, device drivers, redundant processing units, external disk drive arrays, RAID systems, tape drives, and data archival storage systems, etc.

Figure 3:
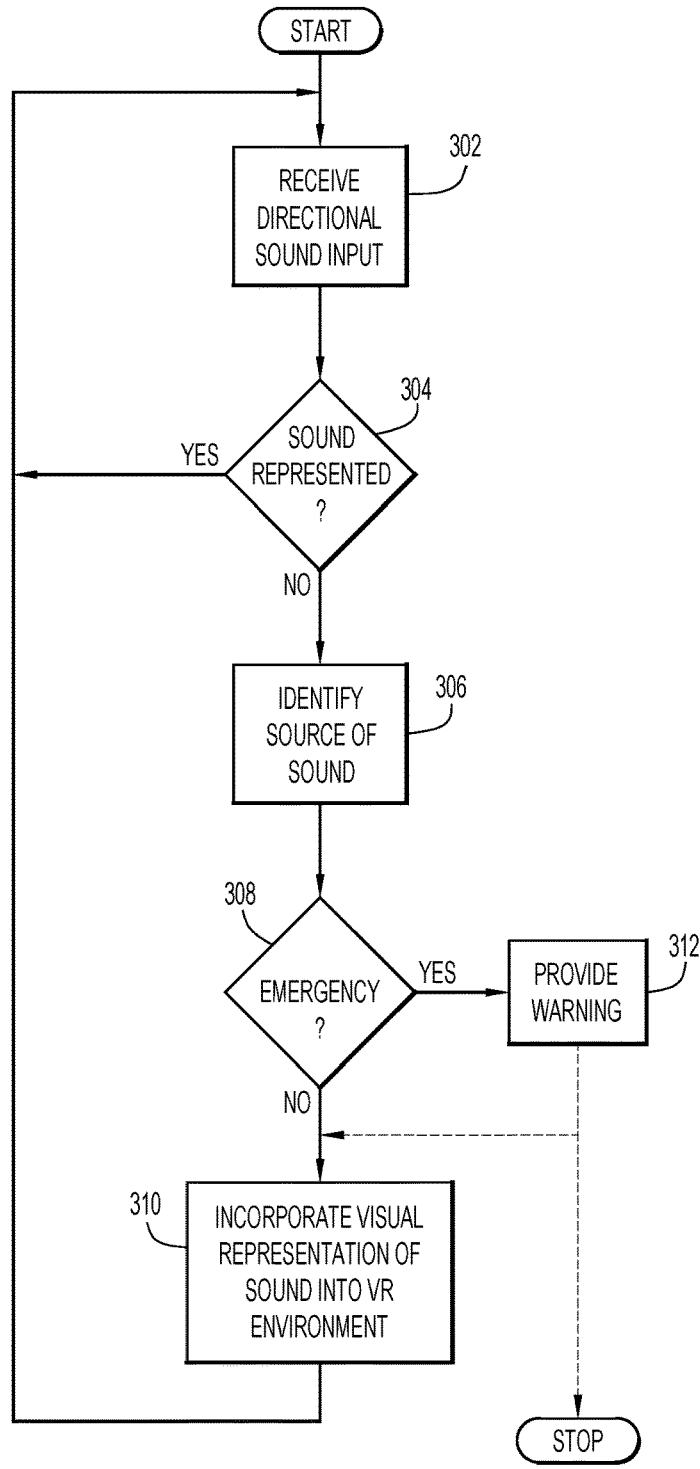
FIG. 3 is a flowchart that explains example processing that may be performed by one or more processing systems in embodiments of the invention.

FIG. 3 is a flowchart that illustrates example processing that may be performed in various embodiments. The process may begin by receiving directional sound input from a real world environment and providing the directional sound input to one or more processing systems 104 (act 302). In some embodiments, the directional sound input may be received via two or more directional microphones 221, which may be mounted on virtual reality device 105. One or more processing systems 104 may determine whether a sound included in the directional sound input is already visually represented or queued up to be visually represented in a virtual reality environment (act 304). If so, then one or more processing systems 104 may wait for additional directional sound input from virtual device 105 (act 302).

If, during act 304, one or more processing systems 104 determines that the sound is not represented or queued up to be represented in the virtual reality environment, then one or more processing systems 104 may identify a source of the sound and a direction and approximate distance of the source from virtual reality device 105 (act 306). Act 306 is described in more detail below with reference to FIG. 4.

Next, one or more processing systems 104 may determine whether the sound indicates a dangerous situation for a user of virtual reality device 105 (act 308). Dangerous sounds or sounds of interest may be crowd sourced for their value or impact. As an example, sounds such as cat sounds and their associated comments or likes may be obtained from a website of publicly available sounds, including, but not limited to, Facebook® (Facebook is a registered trademark of Facebook, Inc., a Delaware Corporation). Based on the associated comments, the system may classify the sound as calming and funny. On the other hand, a matched sound of a whip may result in a warning being provided to the user. In some embodiments, virtual reality device 105 may provide real world sound and sights to the user with the warning. Other examples of sounds that may indicate a dangerous situation may include, but not be limited to, an animal growling, people shouting; an explosion; a crashing sound, tires screeching, etc. If the sound does not indicate a dangerous situation, then processing system 104 may incorporate a visual representation of the sound into the virtual reality environment in a direction and at an approximate distance as determined by one or more processing systems 104 (act 310). The sound may be provided in the virtual reality environment at a loudness commensurate with the detected distance. In some embodiments, one or more processing systems 104 may incorporate a visual indicator of a direction of the source of the sound into visual content to be provided to virtual reality device 105. For example, a passing car may be visually represented with a bright indicator from a direction of travel. If a source of the sound is not observable from a current location of the virtual reality device in the virtual environment, then the visual representation may be queued up to be seen when the source of the sound would be observable from a current location of the virtual reality device in the virtual reality environment (act 310).

Once a source of the sound is identified, during act 306, one or more processing systems 104 may obtain a visual representation of the source of the sound from online image repository 110, which may include visual representations of a number of sound sources. In some embodiments, online content 108 may be searched for public images corresponding to visual representations of various sources of sound. One or more processing systems 104 may then provide virtual reality content, including an incorporated visual representation corresponding to an identified source of a sound to virtual reality device 105 for presentation to a user.

In some embodiments, virtual reality device 105 may obtain information regarding a distance and direction of a source of a real world sound. Virtual reality device may derive the distance and direction of the source based on detected directional sound input or the distance and direction may be derived by one or more processing systems 104, which may provide the distance and direction to virtual reality device 105. Virtual reality device 105 may present a visual indicator of the distance and/or the direction of the source of the sound. In some embodiments, the visual indicator may be a flashing indicator, a solid indicator, or an indicator of a particular shape. A color of the visual indicator such as, for example, red or another color, may indicate a possible danger to the user of virtual reality device 105. In some embodiments, a shape of the visual indicator may represent information regarding the source of the sound.

If, during act 308, processing system 104 determines the source of the sound to be an indication of a dangerous situation, then processing system 104 may provide data to virtual reality device 105 to cause virtual reality device 105 to provide a visual and/or an audio warning to the user (act 312). The visual warning may be a flashing indicator appearing on a display of virtual reality device 105. In some embodiments, the flashing indicator may be a red flashing indicator. In other embodiments, the warning may be provided to the user by virtual reality device 105 stopping the virtual reality session and displaying the real world surroundings to the user. Images of the real world surroundings may be provided via one or more image capturing devices 244 included in virtual reality device 105. The displaying of the real world surroundings may be accompanied by an audio warning in some embodiments.

Figure 4:
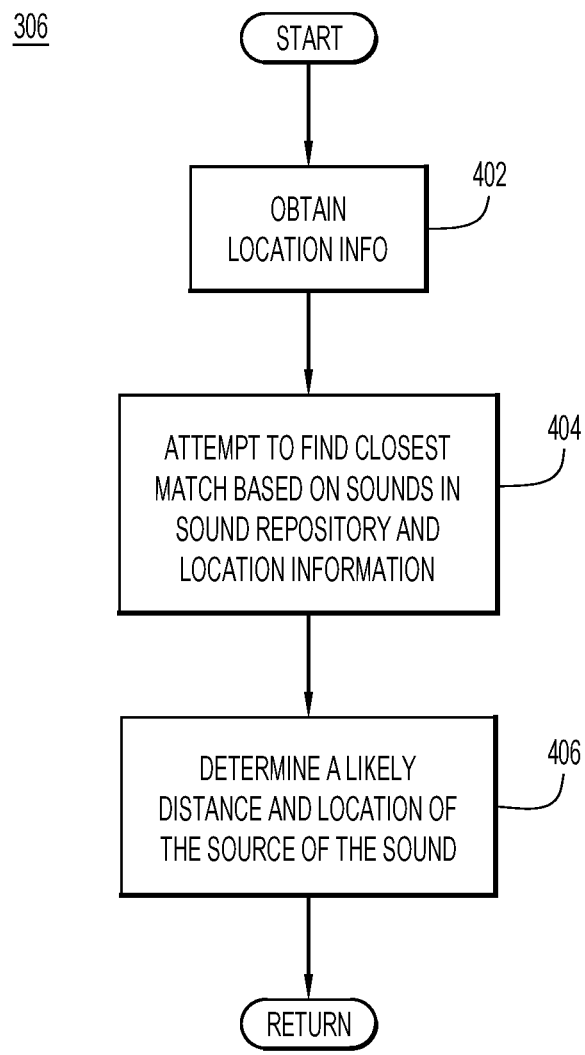
FIG. 4 is a flowchart that illustrates an example process for finding a closest match to a detected real world sound and determining a likely distance and location of the source of the real world sound.

FIG. 4 is a flowchart illustrating, in more detail, processing associated with act 306 of FIG. 3 for identifying a source of a detected real world sound. The process may begin with one or more processing systems 104 obtaining location information from virtual reality device 105 (act 402). Virtual reality device 105 may obtain the location information via location sensor 229. Location sensor 229 may include, but not be limited to, a Global Positioning Satellite (GPS) sensor, a Wireless Fidelity (WiFi) positioning sensor, or another type of location sensor. WiFi positioning sensor determines a current location based on measuring signal strengths of known WiFi access points, or hotspots, and detecting Signal Strength IDentifiers (SSIDs). Virtual reality device 105 may provide the location information periodically to one or more processing systems 104. In some embodiments, virtual reality device 105 may include a geo tag with the directional sound input provided to processing system 104.

One or more processing systems 104 may attempt to find a closest match for a detected sound by comparing characteristics of the detected real world sound with information stored in an online database such as, for example, online sound repository 106 (act 404). In some embodiments, online sound repository 106 may include a dataset having an Application Program Interface (API) into an Open source Computer Vision (OpenCV) sound repository. Online sound repository 106 may further include geotags along with data corresponding to each of a number of sounds. The geotags may associate particular sounds with corresponding locations. For example, a sound may be detected at a location known to be close to a zoo. Processing system 104 may attempt to match characteristics of the detected sound with characteristics of sounds, stored in online sound repository 106, that are geotagged with a nearby location, which may be the location of the zoo. Further, an approximate direction and an approximate distance to a source of the detected sound may be determined based on a number of factors including, but not limited to, a proximity of virtual reality device 105 to a location known to be a source of a sound with characteristics similar to the detected sound, a volume level of a detected sound, a predetermined volume level of the sound with similar characteristics at the source of the sound, etc. (act 406).

In some embodiments, online sound repository 106 or another database may include information regarding a location close to the current location of virtual reality device 105. For example, if a location close to the current location of virtual reality device 105 is a train station, processing device 104 may access information about the train station including, but not limited to, hours of operation, train schedules for trains arriving and departing from the train station, etc. One or more processing systems 104 may use the information regarding the close location and other information such as, for example, local time, to determine a visual representation of the source of the sound. For example, the visual representation may include an image of a train full of commuters, a train that is nearly empty, a type of train represented, etc.

The environment of present invention embodiments may include any number of computers or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Internet, Intranet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A machine-implemented method for creating a virtual reality environment comprising:
   receiving, by at least one processing system, information regarding a real world sound detected in an environment in which a virtual reality device is located;
   identifying, by the at least one processing system, a source of the real world sound;
   accessing, by the at least one processing system, information regarding a location close to a current location of the virtual reality device, the accessed information including at least one of hours of operation and a schedule associated with the location close to the current location of the virtual reality device;
   using, by the at least one processing system, a local time of day for the current location of the virtual reality device and the at least one of the hours of operation and the schedule associated with the location close to the current location of the virtual reality device to determine a visual representation of the source of the real world sound; and
   providing, by the at least one processing system, the visual representation in virtual reality content to the virtual reality device for presentation to a user in a virtual reality session.

2. The machine-implemented method of claim 1, wherein the identifying the source of the real world sound comprises:
   matching characteristics of the real world sound to characteristics of a sound stored in a repository.

3. The machine-implemented method of claim 2, wherein:
   the at least one processing system receives current location information from the virtual reality device, and
   the repository includes a representation of one or more sounds and respective location information regarding a known location corresponding to a respective source of each of the one or more sounds.

4. The machine-implemented method of claim 1, wherein the identifying the source of the real world sound comprises:
   determining, by the virtual reality device, a distance and a direction of the source of the sound.

5. The machine-implemented method of claim 4, wherein the presentation to the user includes displaying of the visual representation of the source of the real world sound incorporated into a virtual reality environment based on the determined distance and the determined direction.

6. The machine-implemented method of claim 5, wherein the visual representation of the source of the sound is based on an image from one of a repository of images and a public image obtained via a computer network.

7. The machine-implemented method of claim 1, further comprising:
   detecting, by the at least one processing system, a real world dangerous situation; and
   in response to detecting the real world dangerous situation, providing from the at least one processing system to the virtual reality device at least one of an audio warning and a visual warning regarding the real world dangerous situation.

8. A system for creating a virtual reality environment, the system comprising:
   at least one processing system;
   a network interface for connecting the at least one processing system to a virtual reality device via a network; and
   a memory connected with at least one processor of the at least one processing system, the memory including instructions that configure the at least one processor to perform:
      receiving information regarding a real world sound detected in an environment in which a virtual reality device is located;
      identifying a source of the real world sound;
      accessing information regarding a location close to a current location of the virtual reality device, the accessed information including at least one of hours of operation and a schedule associated with the location close to the current location of the virtual reality device;
      using a local time of day for the current location of the virtual reality device and the at least one of the hours of operation and the schedule associated with the location close to the current location of the virtual reality device to determine a visual representation of the source of the real world sound; and
      providing the visual representation in virtual reality content to the virtual reality device for presentation to a user in a virtual reality session.

9. The system of claim 8, wherein the identifying the source of the real world sound comprises:
   matching characteristics of the real world sound to characteristics of a sound stored in a repository.

10. The system of claim 9, wherein:
    the at least one processing system receives current location information from the virtual reality device, and
    the repository includes a representation of one or more sounds and respective location information regarding a known location corresponding to a respective source of each of the one or more sounds.

11. The system of claim 8, wherein the identifying the source of the real world sound comprises:
    determining a distance and a direction of the source of the sound.

12. The system of claim 11, wherein the presentation to the user includes displaying of the visual representation of the source of the real world sound incorporated into a virtual reality environment based on the determined distance and the determined direction.

13. The system of claim 12, wherein the visual representation of the source of the sound is based on an image from one of a repository of images and a public image obtained via a computer network.

14. The system of claim 8, wherein the at least one processor is configured to perform:
    detecting a real world dangerous situation for the user of the virtual reality device; and
    in response to the detecting the real world dangerous situation, performing:
       causing the virtual reality session on the virtual reality device to stop, and
       causing real world visual and audio to be presented to the user via the virtual reality device.

15. A computer program product comprising:
    a computer readable storage medium having computer readable program code embodied therewith for execution on a processing system, the computer readable program code being configured to be executed by the processing system to:

receive information regarding a real world sound detected in an environment in which a virtual reality device is located;

identify a source of the real world sound;

access information regarding a location close to a current location of the virtual reality device, the accessed information including at least one of hours of operation and a schedule associated with the location close to the current location of the virtual reality device;

use a local time of day for the current location of the virtual reality device and the at least one of the hours of operation and the schedule associated with the location close to the current location of the virtual reality device to determine a visual representation of the source of the real world sound; and provide the visual representation in virtual reality content to the virtual reality device for presentation to a user in a virtual reality session.

16. The computer program product of claim 15, wherein the identifying the source of the real world sound comprises:
matching characteristics of the real world sound to characteristics of a sound stored in a repository.

17. The computer program product of claim 16, wherein:
the processing system has access to real world location information of the processing system, and
the repository includes a representation of one or more sounds and respective location information regarding a known location corresponding to a respective source of each of the one or more sounds.

18. The computer program product of claim 15, wherein the identifying the source of the real world sound comprises:
determining a distance and a direction of the source of the sound.

19. The computer program product of claim 18, wherein the computer program code is further configured to be executed by the processing system to:
detect a real world dangerous situation for the user of the virtual reality device; and
in response to detecting the real world dangerous situation, provide at least one of an audio warning and a visual warning regarding the real world dangerous situation.

20. The computer program product of claim 15, wherein the computer program code is further configured to be executed by the processing system to:
detect a real world dangerous situation for the user of the virtual reality device; and
in response to detecting the real world dangerous situation, perform:
causing the virtual reality session on the virtual reality device to stop, and
causing real world visual and audio to be presented to the user via the virtual reality device.

* * * * *